United States Patent [19]
Dziennus et al.

[11] Patent Number: 5,574,870
[45] Date of Patent: Nov. 12, 1996

[54] METHOD FOR THE COMMISSIONING OF AN INTERFACE TO BE ALLOCATED TO DIFFERENT TRANSMISSION PATHS IN A PROGRAM-CONTROLLED COMMUNICATION SYSTEM

[75] Inventors: Norbert Dziennus, Dortmund; Detlev Boettger, Schwerte; Ulrich Abel, Essen; Martin Hoppe, Hamm; Matthias Spiel, Holzwickede, all of Germany

[73] Assignee: Siemens Aktiengesellschaft, Munich, Germany

[21] Appl. No.: 405,138

[22] Filed: Mar. 16, 1995

[30] Foreign Application Priority Data

Mar. 16, 1994 [DE] Germany .................. 44 09 023.4

[51] Int. Cl.$^6$ .................. G06F 13/00; G06F 15/177; H04L 12/00
[52] U.S. Cl. .................. 395/309; 395/200.2; 379/399
[58] Field of Search .................. 395/309, 500, 395/200.12, 200.02, 700, 284, 882, 200.1, 200.2; 370/17, 95.1, 60.1; 371/11.2; 379/399, 94, 165; 340/825.03, 827

[56] References Cited

U.S. PATENT DOCUMENTS

| | | | |
|---|---|---|---|
| 4,592,047 | 5/1986 | Fundneider | 370/58.1 |
| 4,961,185 | 10/1990 | Sawada | 370/79 |
| 4,982,325 | 1/1991 | Tignor et al. | 395/309 |
| 5,027,343 | 6/1991 | Chan et al. | 370/17 |
| 5,047,923 | 9/1991 | Elstner et al. | 395/600 |
| 5,070,524 | 12/1991 | Mano | 379/165 |
| 5,117,425 | 5/1992 | Ogata | 370/110.1 |
| 5,142,528 | 8/1992 | Kobayashi et al. | 370/79 |
| 5,184,348 | 2/1993 | Abdelmouttalib et al. | 370/95.1 |
| 5,278,972 | 1/1994 | Baker et al. | 395/500 |
| 5,319,700 | 6/1994 | Mano et al. | 379/94 |
| 5,341,377 | 8/1994 | Ohtani | 370/110.1 |
| 5,414,707 | 5/1995 | Johnston et al. | 370/79 |
| 5,450,396 | 9/1995 | Havermans | 370/58.2 |
| 5,450,486 | 9/1995 | Maas et al. | 379/99 |
| 5,497,373 | 3/1996 | Hulen et al. | 370/9 |
| 5,504,742 | 4/1996 | Kakuma et al. | 370/60.1 |
| 5,517,646 | 5/1996 | Piccirillo et al. | 395/700 |
| 5,519,689 | 5/1996 | Kim | 370/17 |

*Primary Examiner*—Gopal C. Ray
*Attorney, Agent, or Firm*—Hill, Steadman & Simpson

[57] ABSTRACT

ISDN basic interface $S_o$ of an ISDN communication system that can be connected to an $S_o$ interface of an ISDN communication terminal equipment or of an ISDN terminal of a public communication network (ISDN-PSTN) is provided. For automatic recognition and commissioning of such an ISDN terminal, this is first initialized as one of the possible connection modes and the processes of layer 1 and layer 2 are activated in interaction with the administration and maintenance and dependability processes. When it occurs from the message traffic of the individual components that a commissioning is not possible, then the appertaining $S_o$ terminal is initiated with the next connection mode and the commissioning is restarted. The controller previously made the corresponding, new configuring data available. After a successful commissioning, the $S_o$ terminal is ultimately configured in the corresponding connection mode and the messages required for this purpose are communicated to the switching-oriented and administration and maintenance components. After unsuccessful commissioning attempts (line not plugged), the commissioning of all connection modes is again cyclically implemented after a predetermined time.

6 Claims, 5 Drawing Sheets

METHOD FOR THE COMMISSIONING OF AN INTERFACE TO BE ALLOCATED TO DIFFERENT TRANSMISSION PATHS IN A PROGRAM-CONTROLLED COMMUNICATION SYSTEM

BACKGROUND OF THE INVENTION

1. Field of the Invention

The invention is directed generally to communication systems and more specifically to a method for commissioning an interface to be allocated to different transmission paths in a program-controlled communication system. The present invention is particularly directed for use in an integrated services digital telecommunication system having a microprocessor system that controls or coordinates the switching, signaling and the performance features of the communication system. Such a microprocessor system is formed by a microprocessor representing it and by, among other things, memory units that store connection-related and device-related information, and whereby function components or interfaces of the communication system are connected to a local bus system formed by address, data and control lines.

2. Description of the Related Art

The concept of an ISDN (integrated services digital networks) from the communication system provides enabling the subscriber access to a plurality of services of voice, picture, text and data communication. To this end, an ISDN basic access is made available to the subscriber. The basic access has two message channels (B-channels) as well as one signaling channel (D-channel) in both transmission directions. This interface, standardized in CCITT (Comitee Consultatif International de Telegraphique et Telefonique) I.430, is referred to as an $S_o$ interface. Such an $S_o$ interface is an example of an interface that can be allocated to different transmission paths. Among other things, signaling information between terminal equipment and exchange are exchanged in the D-channel. The rules for this exchange are defined in what is referred to as the D-channel protocol. The lower three layers of what is referred to as the layer model for open communication (OSI model) are used for the signaling procedures in the D-channel. The communication is divided into job-related layers in this model for the protocol architecture. In addition to the electrical and physical properties of the $S_o$ interface, a multiple access method is defined in layer 1 that enables common utilization of the D-channel by a plurality of terminal equipment. It is the job of layer 2 to assure the secured transmission of messages of layer 3. To that end, the protocol must do justice both to the demands of the transmission medium as well as to those of the higher-ranking signaling procedures. An ISDN basic interface can be operated in the communication system mode or in the communication terminal equipment mode. The $S_o$ interface to the switching center, however, is not identical in detail with the $S_o$ terminal equipment interface since, for example, it does not comprise the bus mode or the feed. The $S_o$ terminal equipment can be connected in various connection configurations. In addition to a point-to-point mode for the connection of a single ISDN terminal equipment, a point-to-multipoint mode is also possible. Up to a maximum of 8 $S_o$ terminal equipment can be freely distributed at the bus given the four-lead So bus installation.

As already mentioned, the ISDN basic access interface $S_o$ can be provided both for the connection of ISDN communication terminal equipment to a $S_o$ interface as well as for the ISDN connection of a communication network, particularly a public communication network. High flexibility by using the ISDN basic access interfaces is thereby achieved.

For defining the respective operating mode of the $S_o$ interface, administration and maintenance inputs in conjunction with a specific procedure must occur by an appropriate operator via a corresponding service terminal or via connected terminal equipment authorized for this purpose. In a connection to the public communication network, the $S_o$ interface at the exchange side is to be designationally configured as exchange terminal. Given the connection of the $S_o$ interface to $S_o$ terminal equipment such as, for example, $S_o$ telephone equipment, fax devices and personal computers, it is to be defined as a $S_o$ bus by inputting specific information that are correspondingly interpreted by the administration and maintenance.

SUMMARY OF THE INVENTION

It is an object of the invention to provide a method to simplify the configuring and interface of communication systems that can be used in different ways. This object is achieved by a method for commissioning interfaces to be allocated to different transmission paths in a program-controlled communication system having a microprocessor system that controls or, respectively, coordinates switching, signalling and performance features of the communication system. The microprocessor system includes a microprocessor and memory units that store connection-associated and device-associated information and wherein function components or, respectively, interfaces of the communication system are connected to a local bus system formed by address, data and control lines. The method for commissioning interfaces comprises the steps of; initializing an interface to be placed in operation dependent on the transmission path connected thereto, the interface being capable of being used in at least two different operating modes, the initializing of the interface step is undertaken in a first operating mode having an allocated communication protocol by the microprocessor system after the runup of the communication system and the initializing step further includes performing a check to see whether the communication processes deriving therefrom correspond in nature to communication protocol allocated to the first operating mode; automatically, ultimately configuring the interface corresponding to the first operating mode automatically recognized as applicable and storing the interface as such in the memory unit when the interface corresponds to the first operating mode; automatically undertaking the initializing of the interface step in another operating mode in the same way as for the first operating mode when the interface does not correspond to the first operating mode; and repeating the prior operational steps with reference to further operating modes at least until all operating modes have been taken into consideration.

With reference to the different terminal types and, thus, to the underlying operating modes as well, a completely automatic recognition and commissioning of the appertaining terminal is undertaken given a plugged line and, thus, an effectively present distant party. Manual inputs are no longer required. The terminal is initialized as one of the possible terminal types and the commissioning is started. When this commissioning has not occurred within a predetermined time, then the terminal is initialized with the next terminal type and the commissioning is restarted. When the commissioning is successful, then the appertaining terminal is configured in the corresponding terminal type by the messages output from the central controller to the switching-oriented and administration and maintenance processes or program modules. Since the initiation for the initialization of the interface occurred by the dependability and administration and maintenance process in the runup of the communication system, a message exchange between the initially cited function layers 1–3 is undertaken in a way prescribed by the protocol agreements. This message exchange differs dependent on the selected operating mode for the respective interface. The interface is set to a defined mode before every attempted commissioning. When the interface is the $S_o$ interface of an ISDN basic access, then, for example, it must be in the position as interface of the exchange side to accept clock information that arrive via the exchange line and, as an interface ($S_o$ bus) of the subscriber side, it must be capable of outputting clock information to the $S_o$ terminal equipment and evaluating their acknowledgment information.

Given unsuccessful commissioning attempts, the commissioning of all terminal types is re-implemented after a predetermined time according to a development of the invention. This occurs in a cyclical repetition. During this defined waiting time, the $S_o$ terminal in the case of the ISDN basic access is initialized in the most probable terminal type so that a commissioning attempt of the distant party can be reacted to in this condition.

After a commissioning in a development of the invention, a following attempt for automatic recognition is restarted with the operating mode previously recognized as valid and stored. One thus initially assumes that the interface continues to be operated in the same way.

In the preceding description of the critical aspects of the method of the invention, an ISDN basic access $S_o$ was assumed as interface by way of example. In addition to being utilized in such a standardized interface, the method of the invention can also be utilized in the same way in differently fashioned interfaces that can be utilized in terminal types differing from one another. When such $S_o$ interface is fashioned as an integrated telecommunication circuit, then an especially economical realization of, in particular, a small, digital ISDN communication system is possible, even taking the use of user-specifiable, integrated circuits into consideration. The $S_o$ interface can be part of a basic access unit that is connected to the local bus system and that comprises an individual selection line for setting the respective operating mode for each of the possible operating modes.

The method of the invention shall be set forth in greater detail below with reference to exemplary embodiments.

DETAILED DESCRIPTION OF THE PREFERRED EMBODIMENTS

Figure 1:
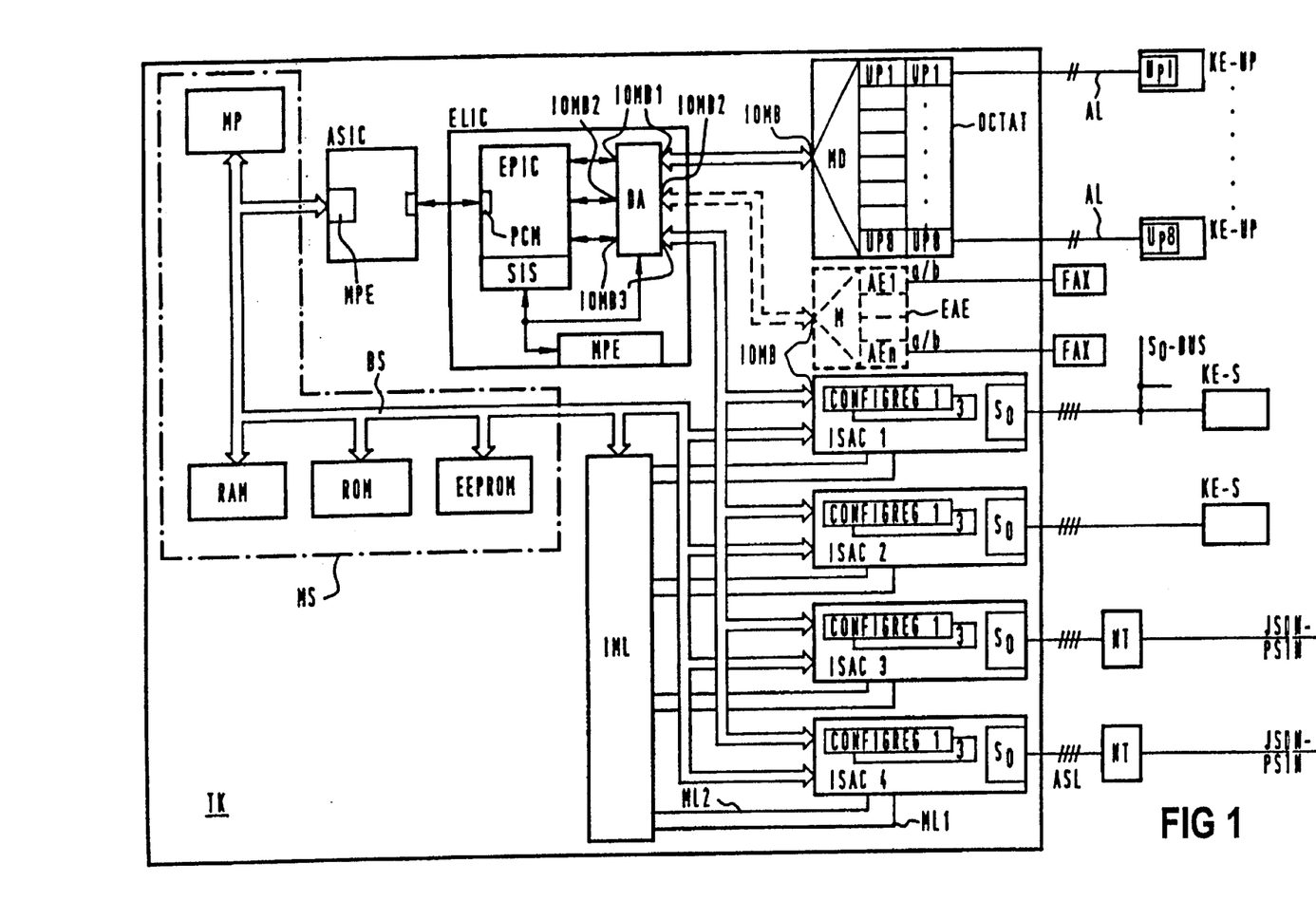
FIG. 1 illustrates a block circuit diagram of an ISDN telecommunication system having ISDN basic access units that can be utilized in different operating modes in the present invention.

The block circuit diagram of FIG. 1 shows an ISDN telecommunication system (known as a small communication system) that comprises only a small plurality of connectable communication terminal equipment devices or a small plurality of terminals to a public network. The communication system TK is essentially formed by a microprocessor system MS, a switching unit ELIC, a transmission unit OCTAT, as well as ISDN and basic access units. Further, a supplementary unit ASIC is also provided that, among other things, serve the purpose of clock generation.

The illustrated transmission unit OCTAT contains eight transmission circuits UP1 . . . UPS. A Up interface Up1 . . . Up8 functioning according to the grouped-time transmission method is realized by these transmission circuits. Each of these interfaces 'Up1 . . . Up8 is provided for the connection of an ISDN communication terminal equipment KE-UP equipped with an identically realized Up interface. To this end, a transmission circuit UP that is realized identical to that in the transmission unit OCTAT is arranged in each of the ISDN communication terminal equipment KE-UP. Further communication terminal equipment can be respectively connected with a message channel to every transmission unit OCTAT with the assistance of additional equipment that are either separate or realized in the communication terminal equipment KE, being connectable in a way that is not shown. For example, such a transmission unit could then be wired with 16 communication terminal equipment.

In this Up interface, the bidirectional information communication covers two message channels—these are referred to as B-channels given ISDN connections—as well as one signaling channel referred to as D-channel and additional information for a frame synchronization, for additional service channels. The signaling procedure is realized according to the methods for ISDN networks standardized at the CCITT. The received message and signaling information or the message and signaling information to be sent are combined to form an information stream with the assistance of a multiplex/demultiplex equipment MD arranged in the transmission unit OCTAT, whereby what is referred to as an ISDN-oriented, internal system bus interface IOMB serves as a controlling interface.

The system interface IOMB is connected to a first, identically realized, internal ISDN-oriented system bus interface IOMB1 of the periphery controller ELIC. This system bus interface is realized in the periphery controller ELIC by a signaling channel control DA with whose assistance the allocation or, respectively, the blocking of the signaling channels or, respectively, D-channels is effected via the central office line AL to the ISDN communication terminal equipment KE-UP.

A further system bus interface IOMB2 equivalent to the first system bus interface is realized in the D-channel controller DA for the optional connection of an expansion access unit EAE. This system bus interface IOMB2 is connected to the expansion access unit EAE that likewise comprises a system bus interface IOMB. Access units AEi . . . AEn are provided in this expansion unit. For example, four such access units can be present. Interfaces a/b are realized in them for the connection of analog communication terminal equipment. This expansion access unit can be particularly provided for the connection of analog facsimile terminal equipment FAX. The known analog signaling and message transmission procedures are realized with the assistance of the existing access units AE1 . . . AEn. The digitized, analog information signals are combined with the assistance of a multiplex means M and are supplied to the system bus interface IOMB. Analogously thereto, the message or, respectively, signaling information communicated from the system bus interface IOMB are demultiplexed and forwarded to the access units AE. The expansion access unit EAE is advantageously realized by integrated telecommunication circuits (for example, SICOFI).

A further ISDN-oriented, internal system bus interface IOMB3 is realized in the signaling channel controller DA. This system bus interface, which is identical to the first system bus interface IOMB1, is connected in parallel to four ISDN basic access units ISAC1–ISAC4 in the exemplary embodiment. Each of these basic access units is equipped with a system bus interface IOMB. As shall be set forth later, a connection to an ISDN central office line or to an ISDN communication terminal equipment device occurs via these ISDN basic access units ISAC.

The system bus interfaces IOMB1 . . . IOMB3 are connected to a switching unit EPIC via the signalling channel controller DA. A switching network means, for example, in the form of a time slot-controlled switching network, is implemented in this switching unit. Message channels can be switched with respectively 64 KB/s with the assistance of this switching network. The switching unit EPIC further comprises a bidirectionally fashioned terminal PCM that is connected to an identically fashioned terminal of the supplementary unit ASIC. A signaling controller SIS is provided in the switching unit cycle. The signaling information contained in or, respectively, to be inserted into the signaling channels or, respectively, D-channels are read or, respectively, inserted with the assistance of this signalling controller SIS and are conducted to a microprocessor unit MPE or, respectively, accepted by the latter. A microprocessor unit MPE is likewise implemented in the supplementary unit ASI for an information exchange with the microprocessor system MS.

The microprocessor system MS is formed by a microprocessor MP and by memory units allocated to the latter. In particular, the programs that coordinate the switching-oriented functions and the components of the communication system TK are stored in the read-only memory ROM. The main memory of the microprocessor MP and a memory area for call-associated storing of call information are provided in the random access memory RAM. The main memory serves, among other things, for the acceptance of temporary data for executive program sequencing. Given a voltage outage, the memory EEPROM does not lose the data stored in it; it represents what is referred to as the customer data memory.

Both the internal connection between the microprocessor MP, the read-only memory ROM, the random access memory RAM as well as the connection to the microprocessor units MPE of the supplementary unit ASI and of the periphery controller ELIC and of the ISDN basic access units ISAC1 . . . ISAC4 are effected with the assistance of a local bus system BS. In a way that is not shown, this local bus system is formed by dam, address and control lines.

As already mentioned, basic access units ISAC are present wherein an $S_o$ interface standardized in the CCITT recommendations is respectively realized for ISDN basic accesses. This interface can be connected to one of the mode select lines ML1 or ML2 in a communication system or ISDN communication network mode by a corresponding selection signal. The corresponding lines ML1 or ML2 are each respectively connected to a module IML (ISAC mode latch). This module itself has access to the local bus BS. Dependent on the information communicated by the controller, specific potentials can be applied to these mode select lines ML1 or ML2. A hardware switching of the basic access unit ISAC can be undertaken with these potentials. The microprocessor system MS writes a corresponding bit pattern into the module IML so that the mode select lines are set to the level corresponding to the desired mode. The ISDN basic access unit ISAC can be configured such that the appertaining $S_o$ interface is connectable to a communication terminal equipment device having an $S_o$ interface as well as to an ISDN terminal of a public communication network ISDN-PSTN (public switched telephone network). Dependent on the operating mode, i.e. dependent on the terminal type of the basic interface $S_o$, configuration registers in the respective ISAC module are set by the microprocessor system via the local bus BS. A plurality of these configuration registers are present in every module. For example, these are the registers CONFIGREG1 . . . CONFIGREG3 for the basic access unit ISAC4. This unit is integrated in the memory layout of the communication system, and the controller accesses these configuration registers via the corresponding addresses and enters the corresponding values. Assume in the exemplary embodiment that two ISDN terminals of a public communication network ISDN-PSTN are respectively connected to an So interface of the telecommunication system TK. In the exemplary embodiment, the two other So interfaces are conducted to ISDN communication terminal equipment. Another version of the connections, as already mentioned, is possible at any time on the basis of a simple load switching of the ISDN basic access units ISAC1 . . . ISAC4 dependent on the plurality of desired ISDN connections of a public communication network ISDN-PSTN or on a desired plurality of communication terminal equipment, symbolized by one terminal equipment KE-S. The $S_o$ interface at the terminal equipment side in the telecommunication system TK serves the purpose of connection to an internal $S_o$ bus terminal equipment line. As already mentioned, up to eight ISDN communication terminal equipment devices can be connected to such an $S_o$ bus. A point-to-multipoint mode is thus possible via such a four-lead $S_o$ bus installation. Given connection of a plurality of terminal equipment devices to the $S_o$ bus, auxiliary information, for example, a service recognition selection of the desired communication terminal equipment, can be communicated.

Upon connection of an ISDN line to the public network, the transmission path is divided into what is referred to as a U-transmission part from the exchange to the network termination NT and into an S-transmission part from the network termination part NT via the basic units to the respective terminal equipment of the private branch exchange communication system. The U-transmission path thereby has the job of bridging the distance and the S-transmission part has the job of realizing the idea of operating a plurality of terminal equipment at one basic access that is the idea underlying ISDN. For example, the line to the public network can represent what is referred to as a $U_{KO}$ line. This transmission method represents a two-wire duplex transmission method with echo compensation. The interface $U_{KO}$ is converted onto the interface $S_o$ in the network termination NT.

It is the provided that the operating mode or the terminal type of each and every $S_o$ interface of the basic access unit ISAC is completely automatically recognized without the necessity of administration and maintenance inputs from an operator and the commissioning of the ISDN terminal as $S_o$ exchange terminal or as $S_o$ bus terminal ensues.

Figure 2:
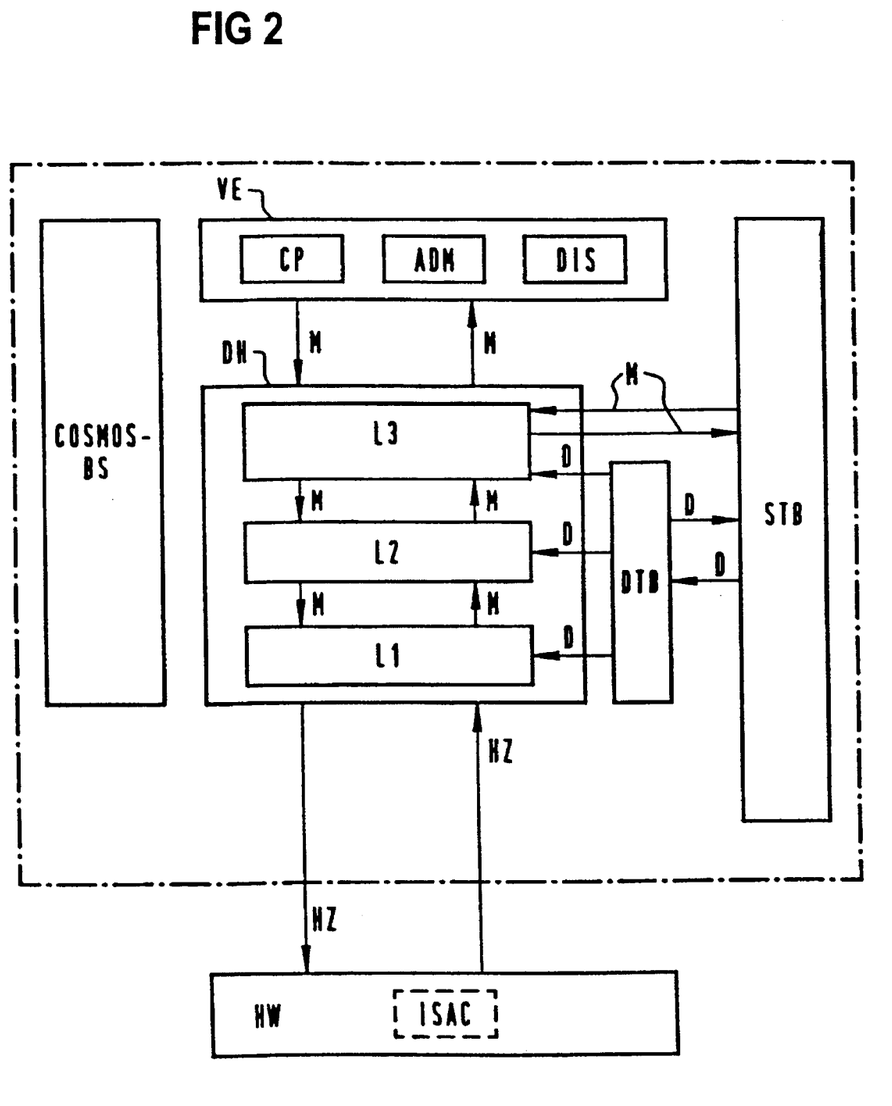
FIG. 2 illustrates components used in the commissioning of the interface of the present invention.

Specific algorithms are implemented for this automatic recognition of the ISDN interface. Upon run up of the system, the correct configuration is automatically recognized. Configurations that have been recognized are stored reset-proof. The components that participate in the automatic recognition and commissioning are shown in FIG. 2. The participating components are the components of database DTB, the dependability and administration and maintenance component STB and the device-oriented component DH (device handler). Each of the program modules DH offers a system-uniform interface to the structural level of the switching technology. The information exchange between the line technology structure level DH and the structural level of the switching technology occurs with defined messages. The terminating message bits between the individual components are indicated with an arrow referenced M. The data interfaces are indicated by an arrow referenced D, whereas the hardware access possibility is characterized by the arrow HZ. The components CP (call processing) is a switching procedure program module that also contains the performance feature control. The module ADM is responsible for administration jobs and the module DIS present for the display control are indicated in the switching technology structure level VE. The components of the level VE do not directly participate in the recognition and in the commissioning of an $S_o$ interface. After commissioning has occurred or after an unsuccessful commissioning attempt, however, a corresponding message that triggers an acknowledgement information is communicated to them.

The jobs of the switching procedure program mode comprise, for example, the subprocesses of the overall switching procedure required for the control of the call setup and of the call cleardown. Thus, authorizations are checked and the switching code analysis is implemented. A signalling of switching-oriented statuses also occurs between communication terminal equipment and an activation and a deactivation of switching technology performance features can be implemented proceeding from the various switching-oriented statuses.

The components are under the influence of the schematically indicated operating system COSMOS-BS that coordinates the arising jobs. Dependent on events that have arrived or that have been internally formed within the system controller, processing rules are assigned to the microprocessor system MS. These also contain a reaction to the various events. With reference to the commissioning of an interface, the operating system BS is in the position to control real-time sequences. Software packets are implemented message-controlled as priority-oriented processes.

In FIG. 2, HW indicates the hardware that, for example, is present according to FIG. 1. An access to the basic access unit ISAC occurs, for example, from the software complex DH proximate to the terminal equipment. The first three layers L1-L3 (layer 1 through layer 3) of the layer model have been identified with the sub-components L1-L3 in the component DH (device handler). These layers are fundamentally independent processes that communicate with one another via messages. Each layer thereby has a job permanently allocated to it. As physical layer L1, the layer 1 has the job of bit transmission allocated to it. When this layer 1 is active and synchronized, then an attempt is made to transmit a defined pulse frame to the higher layer 2 (dam link layer) in both directions. When this data protection layer has been built up, then the capability of layer 1 to transmit data packets, i.e. messages, is used. A determination is made via these messages as to whether a protected data transmission can be undertaken. When this is possible, then the layer 3 (L3) lying on the layer 2 (L2) is used to implement a switching function on the basis of the protected data connection. These three layers of the layer model are defined with L1-L3 in the message flow diagrams of FIGS. 3-5. the events in The automatic commissioning of the interface as either $S_o$ exchange interface or as interface for the $S_o$ bus are shown as corresponding messages or, respectively, as statuses. Given these message sequences of the invention, the reference to the ISDN basic access unit ISAC expresses for layer 1 that the bit patterns defined for the set-up of the layer 1 are sent out by this unit itself after a corresponding command from the central controller. Such a command contains the corresponding switching information on the mode select lines ML1 or ML2 and the setting of the configuration register CONFIGREG that occurs via the bus.

A respective standard data set is matched to the subscriber-side terminal or to the exchange terminal of the $S_o$ interface. Subsequently, the module attempts to communicate with the corresponding distance party. When this does not succeed, then this is subsequently attempted again with the other interface initialization. This automatic recognition and the subsequent commissioning given a recognized operating mode of a plugged line is implemented for the first time with the runup of the communication system. Since a modification of the terminal versions or, respectively, the plugging of a line that defines the distant party are possible at any time, a cyclical repetition of the recognition sequence is undertaken.

After the run up of the communication system, for example, an $S_o$ terminal is placed in operation without further inputs or manual accesses. To this end, for example, the $S_o$ part that belongs to the basic access unit ISAC3 is first treated as an exchange terminal by way of trial and error. This means that the internal register is correspondingly set and that the exchange operating mode is prescribed by a corresponding command of the mode select line ML1 or ML2.

Figure 3:
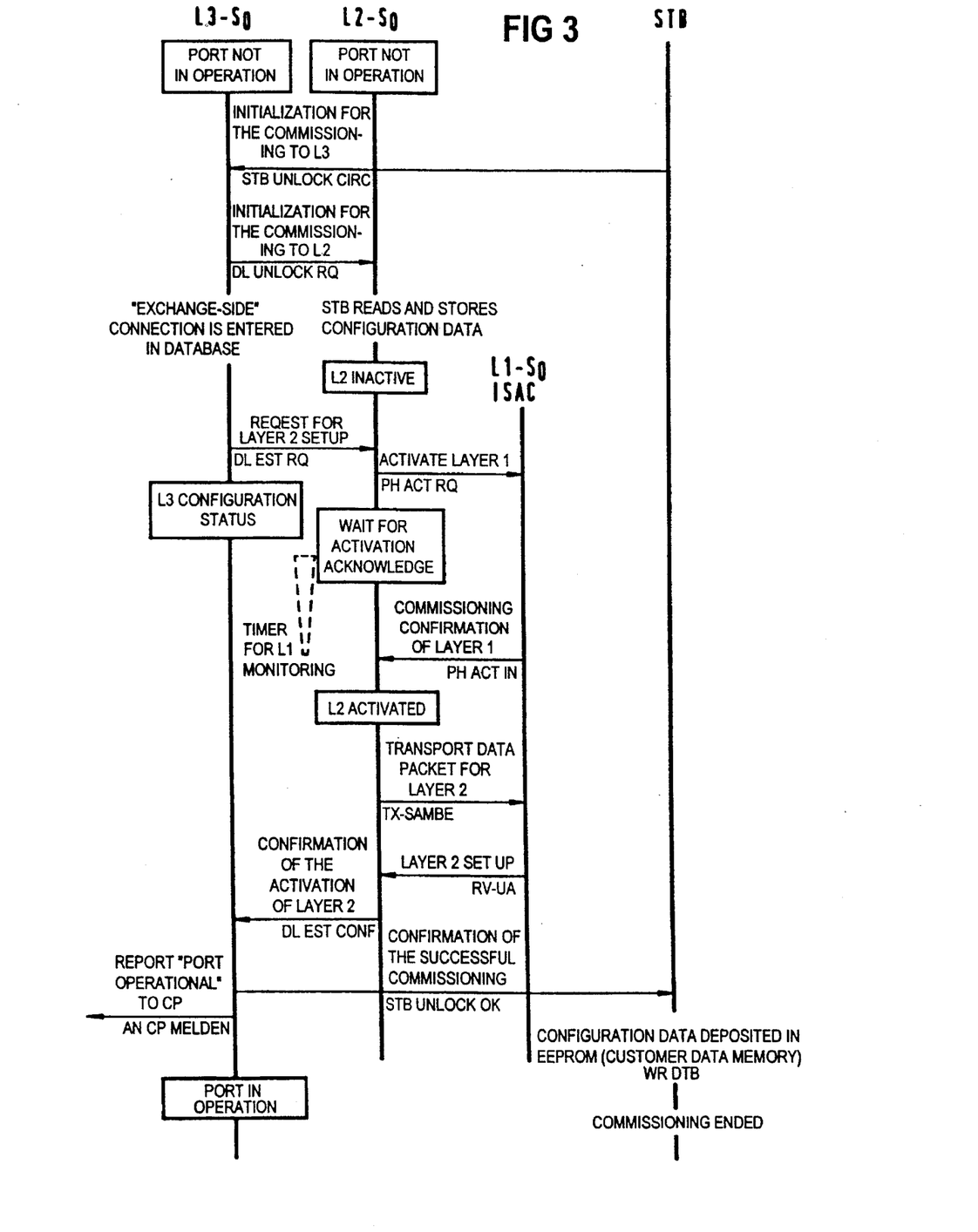
FIGS. 3–5 illustrate message sequence diagrams for recognizing the ISDN interfaces of the present invention.

The message flow diagram is shown in FIG. 3. It shows how messages are mutually communicated between the individual, participating processes and on the basis of what criteria a decision is made that the port is operating in the proper operating mode. The statuses wherein the individual layers, i.e. layer 1 through layer 3, are situated are respectively defined in the rectangularly bounded areas of the diagram. The initial situation for the layer L2 and L3 is the status information that the port is not in operation. Initiated by the central controller, a message is communicated from the administration and maintenance process STB to the process verifying the layer L3 for the initialization for commissioning (STB UNLOCK CIRC). In response thereto, an initialization information for the commissioning is sent to L2 (DL UNLOCK). The appertaining port should first be placed in operation as a terminal of the exchange side, i.e. as an exchange interface, by way of trial and error. The corresponding configuration data are read and stored by the dependability-oriented and by the administration and maintenance process STB. These configuration data are read from the database DTB (FIG. 2) via the corresponding program accesses. The layer L2 switches into the inactive condition. This means that the layer is, in fact, still deactivated but is in readiness for activation. The request for the layer 2 for set up comes from the layer L3 (message DL EST RQ; data link establish request). In response thereto, the message for the activation of the XXX layer 1 is initiated (PH ACT RQ; physical activation request). The layer 2 is in a condition wherein it waits for the activation acknowledgement. The commissioning confirmation occurs from the layer L1 to the layer L2 with the message PH ACT IN (physical activation indication). This switches into the activation status. Simultaneously with this message PH ACT IN, a timer ZG for LI monitoring, which was started in the status "wait for activation acknowledgement", is stopped. No further effects thus derive as a result thereof. The expiration of the timer would have significance only given an unsuccessful commissioning attempt. The layer 2 gives the physical layer the job of transporting a data packet for the layer 2 that has the content TX-SAMBE. When the $S_o$ interface to be placed in operation is in fact a matter of an exchange interface. The message is then transmitted via the two-lead office line ASL to the public exchange ISDN-PSTN. A message RV-UA is sent back from the public exchange via the physical connection that has been set up. This message RV-UA is acknowledging the setup of the layer 2. The acknowledgement regarding the activation of the layer 2 is transmitted to the layer L3 with the message DL EST CONF (data link established configuration). This is the message that is anticipated given a successful recognition of the interface in the L3 configuration condition. Acknowledgment of the successful commissioning is communicated to the dependability and administration and maintenance process STB with the message STB UNLOCK OK. With the message XBTB to the switching-oriented component CP, the process L3 reports that the currently checked port is ready to operate. The layer L3 switches into the condition "port is in operation". The originally prophylactically prescribed configuration data are deposited both in the memory unit RAM as well as in the non-volatile perimeter memory EEPROM, i.e., in the customer data memory, by the dependability and administration and maintenance process.

Figure 4:
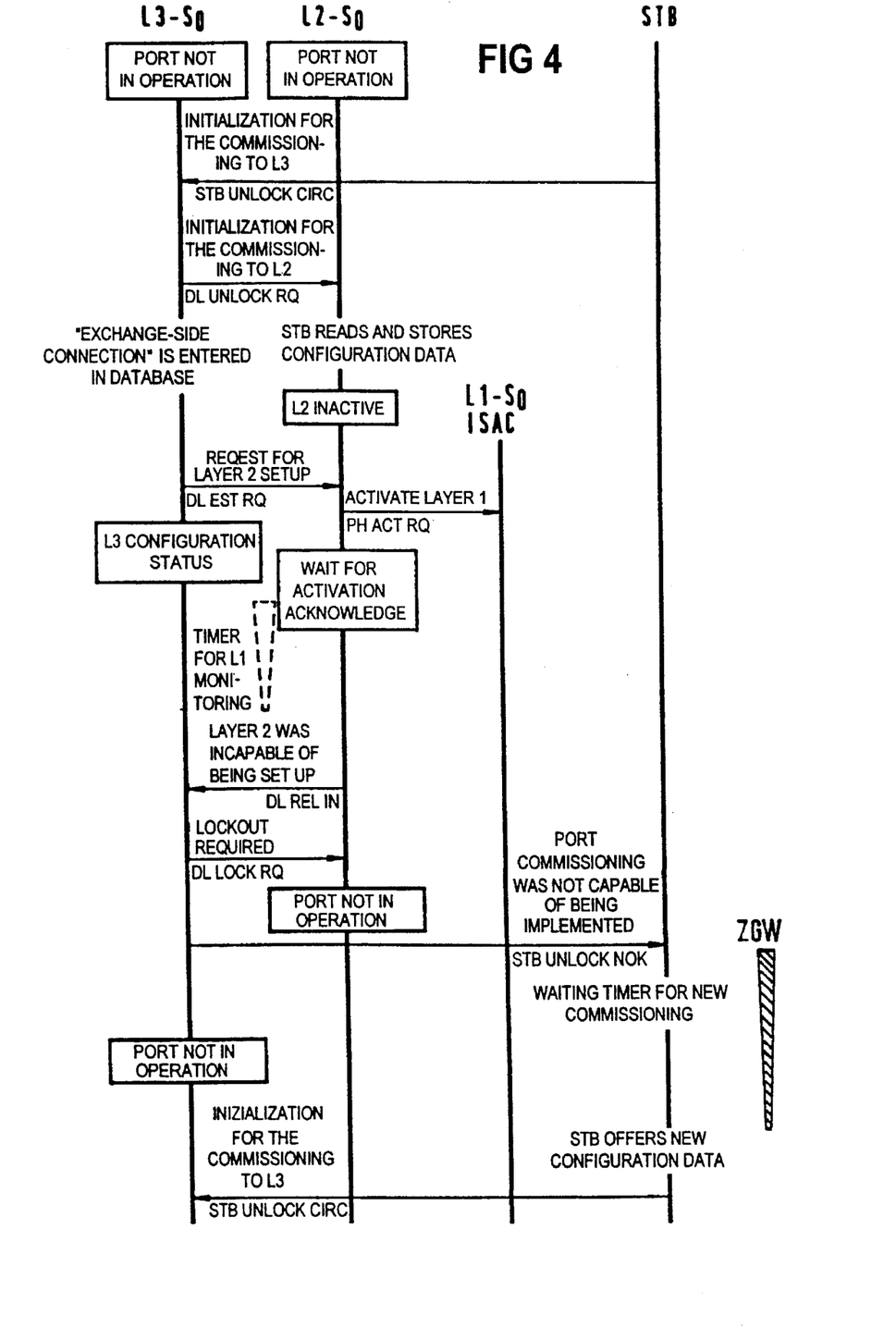

The message sequence described according to FIG. 3 is thus a matter of a successful port commissioning since the port initially assumed to be an exchange interface in fact represents such an exchange interface. If it were assumed that, for example, the $S_o$ interface of the module ISAC3 does not represent such an exchange interface but that what is referred to as an $S_o$ bus is connected thereto, i.e. that it is a matter of an interface of the subscriber, then an attempted commissioning as exchange interface would have to fail. An unsuccessful port commissioning would thus derive if the configuration data allocated to an exchange interface had first been prophylactically input into the configuration register CONFIGREG of this module ISAC3. FIG. 4 shows the message sequence given such an unsuccessful port commissioning.

Up to the configuration status of layer 3 and the status of "waiting for activation acknowledgement" of layer 2, the statuses and the messages coincide with those of FIG. 3. After the message PH ACT RQ (physical activation request), a timer is activated in the same way as in the illustration of FIG. 3. Whereas this timer is reset by the commissioning acknowledgement of the layer 1 given the sequences of FIG. 3 and can thus not expire, no interruption of the running timer is undertaken given the unsuccessful commissioning. Since, as presumed, the $S_o$ interface should not be a matter of an interface of the exchange side, no commissioning acknowledgement of the layer 1 occurs. The monitoring timer thus continues to run uninfluenced. With its expiration, the message DL REL IN (data link release indication) is communicated on layer 2 to layer 3. This message contains the statement that layer 2 was not capable of being set up. The message DL LOCK RQ is communicated from layer 3. This message denotes that the port is locked, i.e. is not in operation corresponding to the initial condition. The information that a commissioning was not capable of being implemented is communicated to the dependability and administration and maintenance process with the message STB UNLOCK NOK. Layer 3 is in the status of "port not in operation".

After such an unsuccessful port commissioning, a timer ZGW is activated that defines the waiting time up to a new commissioning attempt. This time, for example, can amount to 30 seconds.

An attempt is thus subsequently made to place the appertaining $S_o$ interface into operation as an interface of the subscriber side (network side). To this end, the dependability and administration and maintenance processes STB make the configuration data needed for this purpose available. The configuration register in the module ISEC3 under consideration as an example is thus newly set. It is brought into the network-side mode via the mode select lines ML1, ML2. After the expiration of the timer ZGW, a start for the commissioning occurs again. The initialization thereto is communicated to the layer 3, as in the preceding initial condition. Since the terminal is to be a matter of a terminal of the network side, i.e. a matter of the terminal of an $S_o$ bus, a successful port commissioning will derive in the automatic recognition of the invention.

Figure 5:
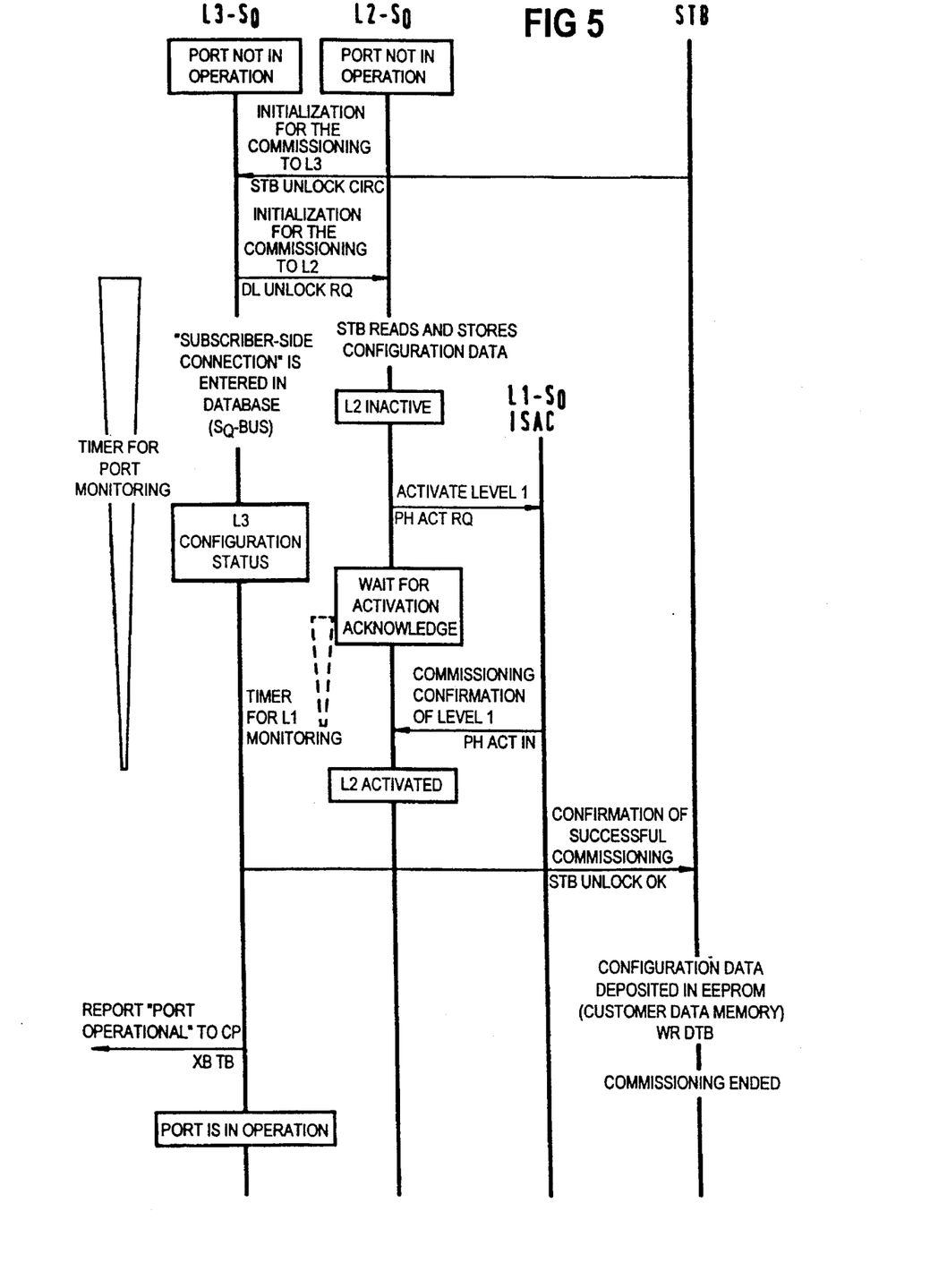

When it is assumed that the $S_o$ bus is connected to $S_o$ interface and an interface of the terminal equipment side is thus involved, then this interface is capable in the allocated mode of outputting clocks to the terminal equipment and of evaluating their acknowledgement information. Proceeding from the status of "port not in operation," the initialization for the commissioning again occurs from the dependability and administration and maintenance process STB, as already described in FIGS. 3 and 4. The message that the commissioning is to be initialized for the layer 2 occurs from layer 3. The appertaining terminal is entered as terminal of the subscriber side in the database, corresponding to its new configuration type. The layer L2 is in the inactive condition. After the initialization for the commissioning to the layer 2, a timer ZG1 is activated in the exemplary embodiment for port monitoring. When this timer ZG1 runs down without a message indication proceeding from layer 2 to layer 3, this is then interpreted as an indication for a successful port commissioning. After layer L2 has switched into the inactive condition, the request for activation of layer 1 occurs with the message PH ACT RQ (physical activation request). Layer 2 switches into the condition of "waiting for activation acknowledgement." Layer 3 is in the configuring status.

A further timer ZG2 is activated after the request for activation of layer 1. When the commissioning acknowledgement of layer 1 occurs on the basis of the message PH ACT IN (physical activation indication), then the expiration of this timer is stopped. Given an unsuccessful port commissioning for the $S_o$ bus, the commissioning acknowledgement would fail to arrive and the timer ZG2 would run down. This would then be the criterion that the port commissioning is not possible in the mode undertaken as starting point for the check. The present case, however, is to be matter of a successful port commissioning of a subscriber interface, so that layer 2 changes into the status "activated" after the commissioning acknowledgement of layer 1. The acknowledgment of the successful commissioning occurs to the dependability and administration and maintenance process STB from layer 3 with the message STB UNLOCK OK.

Given such a successful commissioning at the subscriber side, the corresponding configuration data are then deposited into the non-volatile customer data memory EEPROM. This write access is characterized by wr dtb (write database). The message XBTB from layer 3 to the call-processing component (CP) reports that the port is operational. Layer 3 switches into the status "port is in operation". The criterion for a successfully concluded commissioning given the commissioning of the interface of the subscriber side "$S_o$ bus" is thus the expiration of the timer ZG1. Given an unsuccessful port commissioning, the timer ZG2 for the monitoring of layer L1 would run down and timer ZG1 would be stopped by a message DL REL IN (data link release indication). Layer 2 would then switch into the locked status on the basis of a message DL LOCK to the layer 2. In the case of an unsuccessful port commissioning, a commissioning with the respectively other operating mode, i.e. with the operating mode "exchange terminal" in this example, would then be undertaken after a specific waiting time, for example, 30 seconds. To this end, the dependability and administration and maintenance process STB offers the corresponding configuring data.

What is critical for the automatic recognition and commissioning of the $S_o$ interface as an interface of the exchange side or as an interface of the subscriber side is the face that the dependability and administration maintenance process STB initializes the commissioning. This commissioning switches into an intermediate status and an attempt is made to activate various interface configurations. Due to the reactions specified in the protocol, one can learn whether the interface is utilized in the configuration of the exchange side (user side) or in the configuration of the subscriber side (network side). The conclusions acquired from these reactions are used for automatically placing the interface in operation with the recognition of the respective operating mode.

It should be understood that various changes and modifications to the presently preferred embodiments described herein will be apparent to those skilled in the art. Such changes and modifications can be made without departing from the spirit and scope of the present invention, and without diminishing its attendant advantages. It is therefore intended that such changes and modifications be covered by the appended claims.

We claim:

1. Method for commissioning interfaces to be allocated to different transmission paths in a program-controlled communication system having a microprocessor system that controls or, respectively, coordinates switching, signalling and performance features of the communication system, said microprocessor system including a microprocessor and memory units that store connection-associated and device-associated information and wherein function components or, respectively, interfaces of the communication system are connected to a local bus system formed by address, data and control lines, said method for commissioning interfaces comprising the steps of:

initializing an interface to be placed in operation dependent on the transmission path connected thereto, said interface being capable of being used in at least two different operating modes, said initializing of the interface step is undertaken in a first operating mode having an allocated communication protocol by the microprocessor system after the initial activation of the communication system and said initializing step further includes performing a check to see whether the communication processes deriving therefrom correspond in nature to communication protocol allocated to said first operating mode;

automatically, ultimately configuring the interface to provide an interface configuration corresponding to said first operating mode automatically recognized as applicable and storing the interface configuration in the memory unit when the interface corresponds to said first operating mode;

automatically performing the initializing of the interface step in another operating mode in the same way as for said first operating mode when the interface does not correspond to said first operating mode;

repeating the prior operational steps with reference to further operating modes at least until all operating modes have been taken into consideration; and cyclically restarting said operations for the automatic recognition and commissioning of the interface by the microprocessor system when none of the possible operating modes is recognized as being actually applicable.

2. Method according to claim 1, said method further comprising the step of:

initializing the interface in the most probable operating or, respectively, connection mode in the time span between the cyclical repetitions.

3. Method according to claim 1, said method further comprising the steps of:

undertaking a cyclical repetition of the check when an operating mode is recognized as being valid and stored; and respectively starting said check initially with this appertaining operating mode in the framework of the automatic recognition of the interface.

4. Method according to claim 1, said method further comprising the steps of: providing a standardized integrated services digital networks (ISDN) basic interface as the interface; and providing ISDN terminals of communication networks connectable via the corresponding transmission path in said first operating mode and ISDN communication terminal equipment connectable via the corresponding transmission path in other operating modes.

5. Method according to claim 4, said method further comprising the step of:

providing an ISDN basic access unit constructed as an integrated telecommunication circuit as said ISDN basic interface.

6. Method for commissioning interfaces to be allocated to different transmission paths in a program-controlled communication system having a microprocessor system that controls or, respectively, coordinates switching, signalling and performance features of the communication system, said microprocessor system including a microprocessor and memory units that store connection-associated and device-associated information and wherein function components or, respectively, interfaces of the communication system are connected to a local bus system formed by address, data and control lines, said method for commissioning interfaces comprising the steps of:

initializing an integrated services digital networks (ISDN) basic access unit constructed as an integrated telecommunication circuit as a standardized ISDN interface to be placed in operation dependent on the transmission path connected thereto, said interface being capable of being used in at least two different operating modes, said initializing of the interface step is undertaken in a first operating mode having an allocated communication protocol by the microprocessor system after the initial activation of the communication system and said initializing step further includes performing a check to see whether the communication processes deriving therefrom correspond in nature to communication protocol allocated to said first operating mode;

automatically, ultimately configuring the interface to provide an interface configuration corresponding to said first operating mode automatically recognized as applicable and storing the interface configuration in the memory unit when the interface corresponds to said first operating mode;

automatically performing the initializing of the interface step in another operating mode in the same way as for said first operating mode when the interface does not correspond to said first operating mode;

repeating the prior operational steps with reference to further operating modes at least until all operating modes have been taken into consideration;

providing ISDN terminals of communication networks connectable via the corresponding transmission path in said first operating mode and ISDN communication terminal equipment connectable via the corresponding transmission path in other operating modes; and connecting said ISDN basic access unit to the bus system and an individual selection line for each interface operating mode to set the respective operating mode.

* * * * *